United States Patent

Mason

[15] 3,650,075
[45] Mar. 21, 1972

[54] OPTICAL PROFILE GRINDERS
[72] Inventor: Peter Alan Mason, Kenilworth, England
[73] Assignee: Wickman Machine Tool Sales Limited, Banner Lane, Tile Hill Coventry, Warwickshire, England
[22] Filed: Feb. 10, 1970
[21] Appl. No.: 10,196

[52] U.S. Cl. ..................................................51/165.72
[51] Int. Cl. ..................................................B24b 49/12
[58] Field of Search ........................................51/165.72

[56] References Cited

UNITED STATES PATENTS

| | | | |
|---|---|---|---|
| 2,197,308 | 4/1940 | Kolb et al. | 51/165.72 |
| 2,404,770 | 7/1946 | Bennett et al. | 51/165.72 |
| 2,838,889 | 6/1958 | Lankes | 51/165.72 |

FOREIGN PATENTS OR APPLICATIONS

| | | | |
|---|---|---|---|
| 614,088 | 6/1935 | Germany | 51/165.72 |

*Primary Examiner*—Lester M. Swingle
*Attorney*—Holman & Stern

[57] ABSTRACT

An optical profile grinding machine comprising a workpiece support, a grinding wheel support and means for producing relative movement between the grinding wheel and a workpiece, a platform supporting an enlarged layout of a profile to be reproduced on the workpiece, a microscope for viewing the layout through a reducing lens and the grinding wheel in superimposed relationship so that an operator can reproduce the profile on the workpiece.

12 Claims, 6 Drawing Figures

INVENTOR
Peter Alan Mason

ATTORNEYS

INVENTOR
Peter Alan Mason
Holman, Glascock, Downing & Seebold
ATTORNEYS

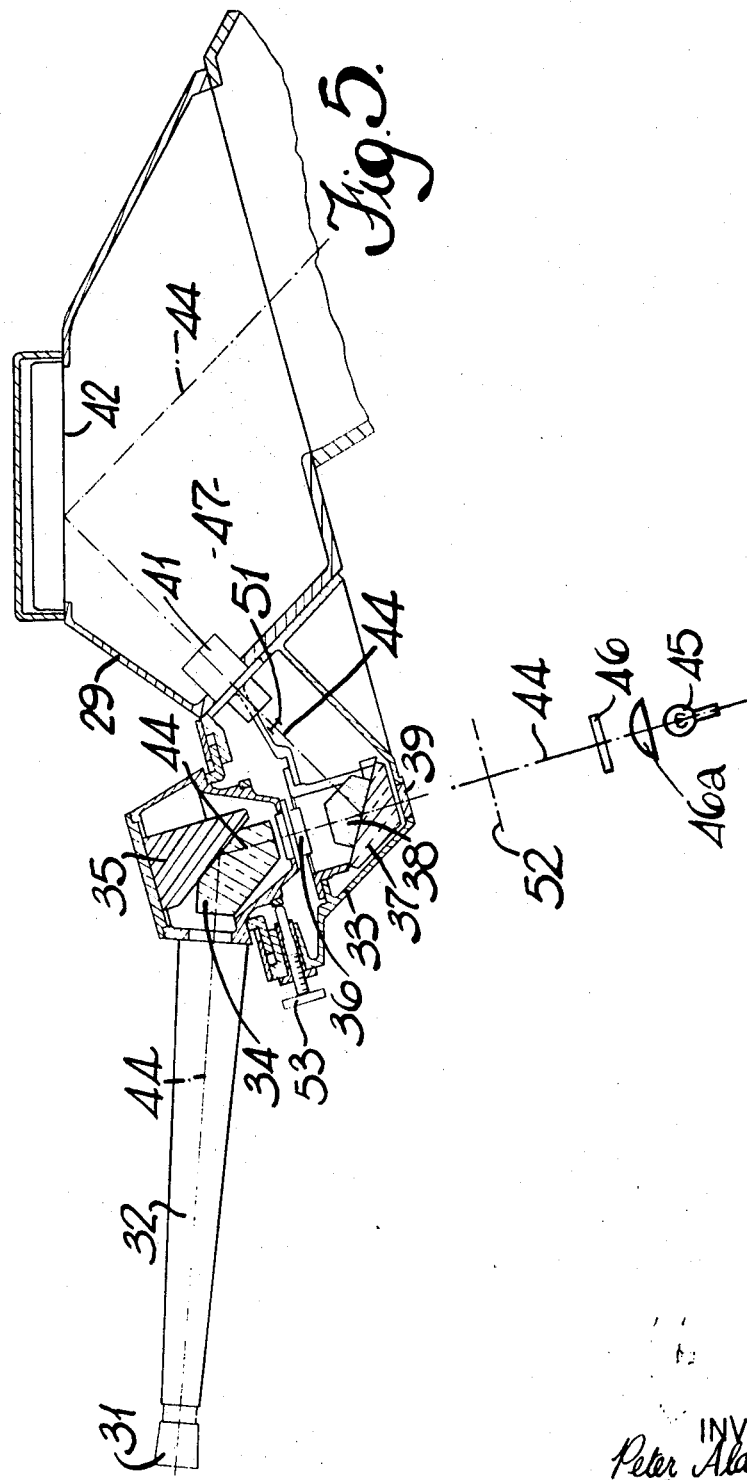

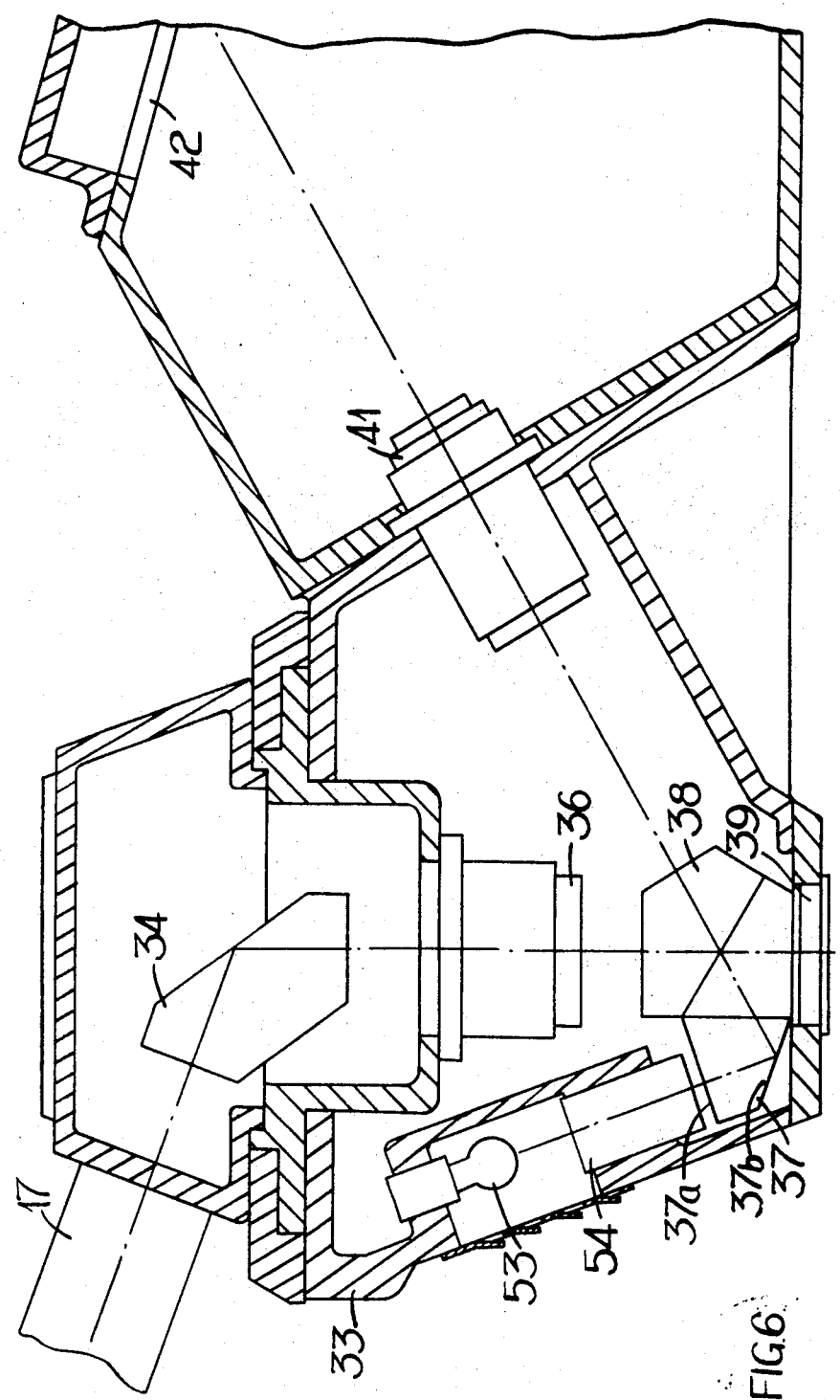

OPTICAL PROFILE GRINDERS

This invention relates to optical profile grinding machines in which an enlarged layout of the shape to be ground is followed by an operator to produce a similarly shaped workpiece by means of a grinding wheel.

It has previously been proposed for a large scale layout to be used in conjunction with a pantograph and microscope mechanism which the operator uses to control the grinding wheel head relative to the workpiece. With this arrangement the operator can view, through the microscope, the workpiece and grinding wheel simultaneously with a graticule of the microscope which corresponds to a selected point on the layout. It has also been proposed to project onto a large screen, an image of the workpiece and grinding wheel. In the same plane as the screen is placed the enlarged profile layout. This arrangement, whilst allowing the operator to view both the work and the enlarged profile together, has the disadvantage that the image is lacking in definition, thus leading to inaccuracy.

The object of the invention is to provide an optical profile grinding machine wherein the accurate grinding of workpieces can be accomplished.

In accordance with the present invention, an optical profile grinding machine comprises, in combination, a workpiece support, apparatus for supporting a grinding wheel, means for producing relative movement between the grinding wheel and the workpiece, a platform for supporting an enlarged layout of a profile to be reproduced on the workpiece, a microscope for viewing the workpiece and grinding wheel and optical elements whereby an image of the layout on the platform can be reduced and superimposed upon the image of the workpiece and grinding wheel visible through the microscope.

The invention will now be described by way of example with reference to the accompanying drawings in which:

FIG. 5 is a cross-sectional view of the optical elements of the invention, and

FIG. 6 is a cross-sectional view of the optical elements in an alternative construction.

The machine illustrated is an optical profile grinder intended to produce workpieces with complex profiles. The method of machining involves mounting the workpiece on the machine and reciprocating a rotating grinding wheel which is advanced to the workpiece under direct operator control. With certain types of workpieces, however, it may be more convenient to rotate the workpiece than to reciprocate the grinding wheel.

Figure 1:
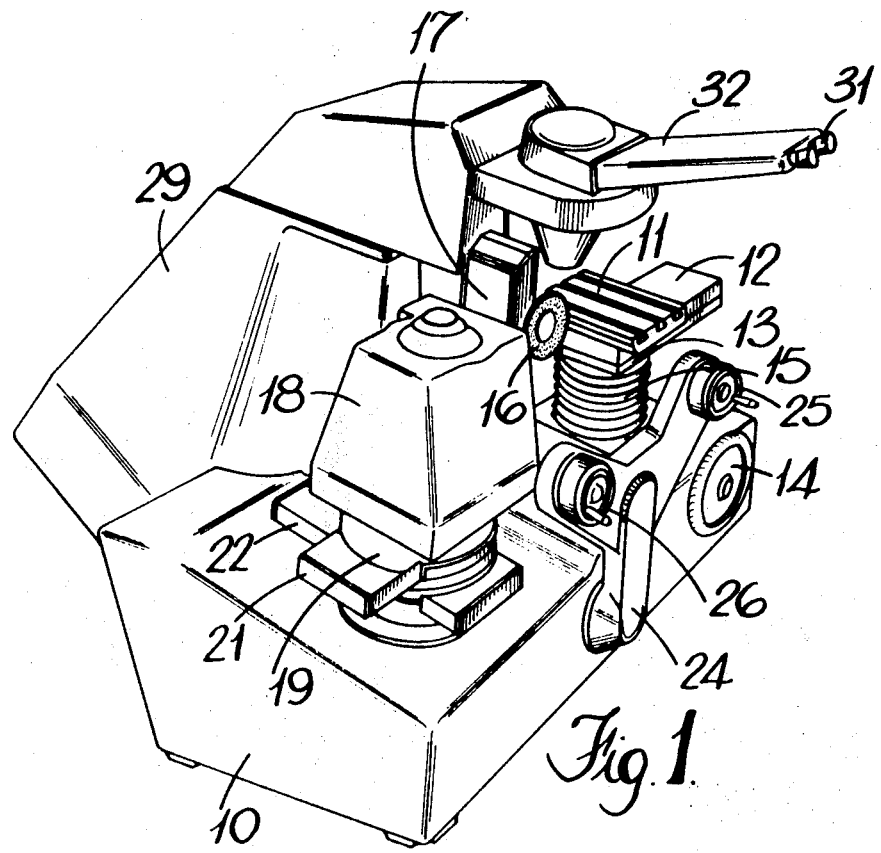
FIG. 1 is a perspective view of a machine constructed in accordance with the invention.
Figure 2:
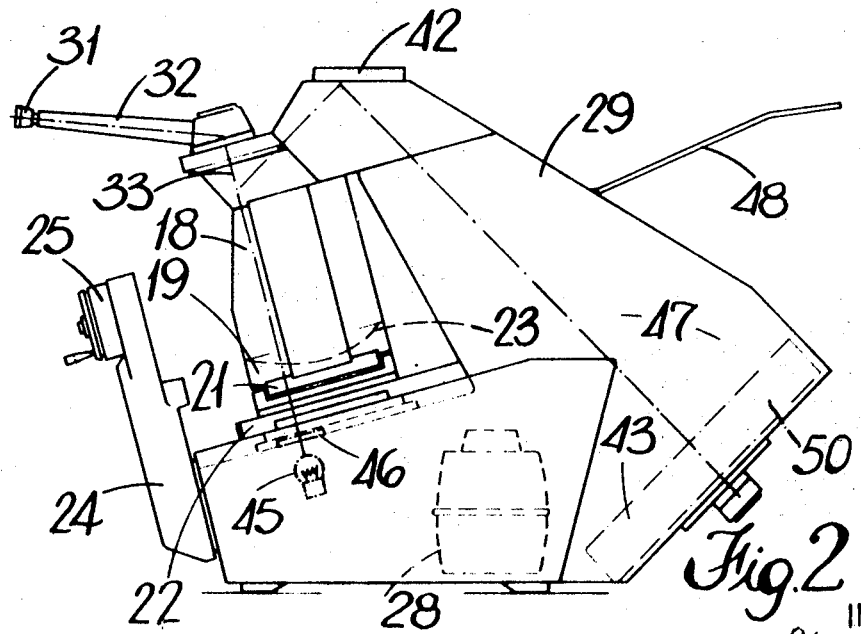
FIGS. 2, 3 and 4 are side elevation, plan and front elevation views of the machine.
Figure 3:
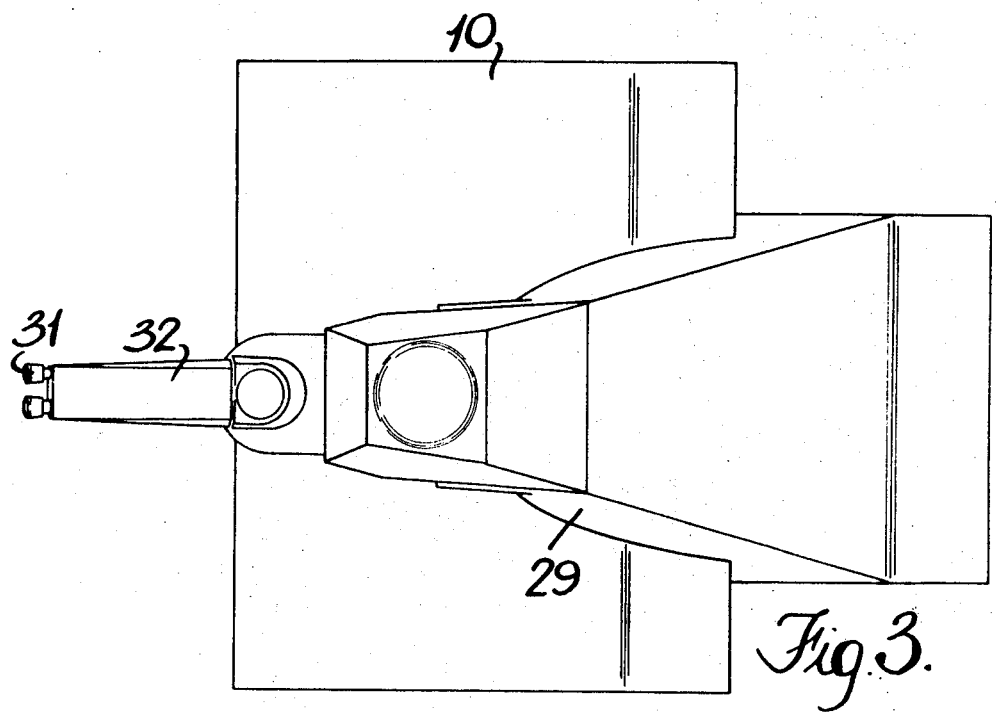

The machine illustrated in all the Figures comprises a base 10 upon which is mounted a workpiece support table 11 (omitted from FIGS. 2 and 3). The mounting for this workpiece support table 11 is in the form of two slides 12 and 13 movable relatively to one another, and to the base, in mutually perpendicular directions. The workpiece support table 11 can also be raised and lowered by means of a control 14 by mechanism enclosed in a bellows 15.

Also mounted upon the base 10 is a grinding wheel support assembly for a grinding wheel 16. This grinding wheel 16 is mounted, with its axis horizontal, upon a slide 17 which is connected to a mechanism (not illustrated) whereby the grinding wheel and slide can be reciprocated in a vertical direction. There is also mounted upon the slide 17 a motor (not shown) whereby the grinding wheel 16 can be rotated. The terms horizontal and vertical are used with respect to the plane of work table 11, but though not illustrated as such, the work table is inclined to the horizontal so that the operator can more readily view it.

The slide 17 is mounted in turn upon a block 18 which is mounted for relative angular movement about a vertical axis, upon a part 19. This part 19 is mounted upon a pair of slides 21, 22 which are movable in a horizontal plane relatively to the base 10 in mutually perpendicular directions. The block 18 is mounted upon the part 19 through complementary part-spherical seatings whereby the grinding wheel support can be tilted relatively to the vertical position shown. The seatings are indicated in FIG. 2 at 23.

Figure 4:
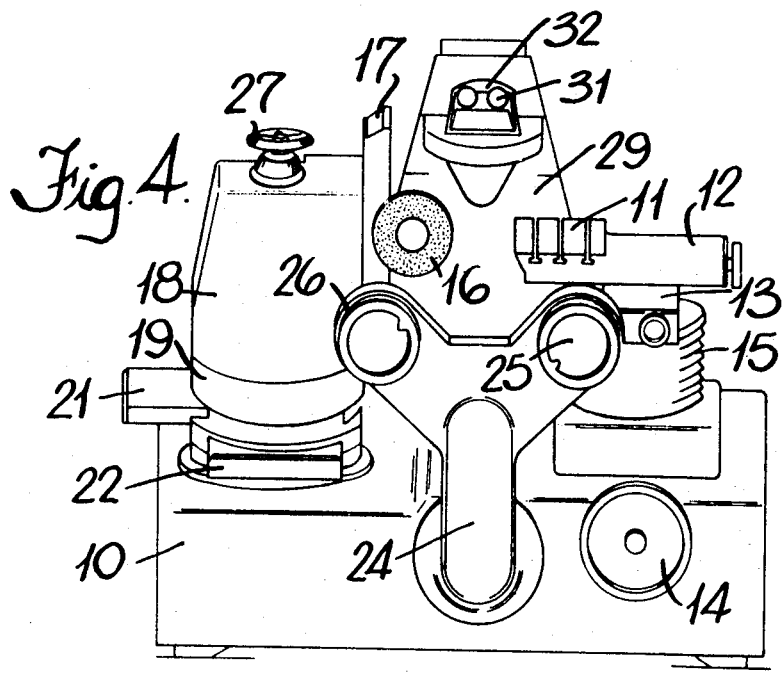

A control console 24 having control wheels 25, 26 is provided on the base 10 of the machine whereby an operator can control the relative positions of the grinding wheel 16 and workpiece. A wheel 27 or other locking means on the top of the grinding wheel support is provided for locking the parts of this together. The wheel 27 is shown only in FIG. 4. The grinding wheel is advanced towards a surface portion of the workpiece by the operator as required so that, as it reciprocates it will produce the required profile on the workpiece. The workpiece support table 11 with the workpiece will be moved at intervals to reposition the workpiece and grinding wheel within a field of vision of a microscope, to be described, whereby the operator can view the work. A dust extraction unit 28 is housed within the base 10.

The machine incorporates an optical system whereby an operator can view the work directly simultaneously with an image of a layout of the profile to be reproduced upon the workpiece.

The layout of the profile is enlarged and in one example is a scribed line in an opaque coating on a transparent sheet. The layout is mounted on a platform 43 within a compartment 47 in the base of a housing 29 mounted on the base 10. Access to the compartment 47 is through a door 48. The platform 43 comprises the top face of a light unit 50 from which light passes through the scribed line on the layout and is reflected by a mirror 42 at the top of the housing 29, through a reducing lens 41 to form a reduced image of the layout at 51. The image of the layout is reflected on the interfaces of two prisms 37, 38 which form a beam splitter prism assembly mounted in a body part 33.

The plane which the workpiece surface occupies is indicated at 52. The plane 52 and the image 51 are both visible through the beam splitter prisms 37, 38 and appear superimposed and at the same scale, through a microscope.

The microscope includes an hollow extension 32 which is adjustably connected to the body part 33 mounted on the housing 29. The extension 32 carries two eyepiece lenses 31 at its end and the microscope elements comprise also an objective lens 36 and a prism 34. This prism 34 is mounted on a block 35. Since the microscope field of view at the required magnification is not always sufficient to permit the whole image to be viewed simultaneously, provision is made for adjustment of the microscope assembly relative to housing 33. This adjustment is achieved by moving the microscope with respect to housing 33 by means of a plurality of screws 53 against a spring loaded detent. The microscope is also capable of rotation about the axis of the objective lens.

The axes of the various light paths are indicated in FIGS. 2, 5 and 6 by chain-dotted lines. In FIG. 5 these are identified by numeral 44.

Beneath the workpiece position is a further light source 45 having a filter 46. This source 45 can direct a beam of collimated light through a condenser 46a and a protective glass cover 39 into the beam splitter prism assembly comprising prisms 37 and 38, and provides contrasting background illumination.

The filter 46 may be of colored glass and serves to provide a contrasting background to the image of the workpiece and grinding wheel observed through the microscope by the operator. Around the filter 46 are dust extraction ducts (not shown).

In this example, the layout occupies a space on the platform 43 approximately 30×30 inches and the microscope elements comprising the eyepieces 31 and the objective lens 36 provide a magnification of 25 to 1. The microscope of course provides magnification of the images, of both the layout and the workpiece. The layout scale reduction, however, is 50 to 1.

The scale reduction of the layout may, in alternative constructions, be 30 to 1 or 40 to 1. Such reduction changes are achieved by substituting alternative reducing lens assemblies 41.

The microscope may also include one or more graticules for assisting in setting up of the machine to facilitate alignment of the images with scale marks on the layout.

In the alternative form shown in FIG. 6, the prism 37 is enlarged to provide a surface 37a through which light from a light source 53 mounted in the body part 33, is transmitted. The light is reflected internally from a surface 37b, which is externally silvered, towards the interfaces of the two prisms 37, 38. The light is here reflected in a direction towards the workpiece, that is in the same direction as the operator's view.

The light source 53 is a quartz halogen bulb and between this and the surface 37a is a collimating system of lenses 54.

If the workpiece surface to be illuminated is not normal to the axis of light transmission crossing the plane 52, the illumination provided by the source 53 may be insufficient. In such circumstances an external light source (not illustrated) may be provided. This is adjusted to provide the illumination from the required direction.

Having thus described my invention what I claim as new and desire to secure by Letters Patent is:

1. An optical profile grinding machine comprising in combination, a workpiece support, apparatus for supporting a grinding wheel, means for producing relative movement between the grinding wheel and the workpiece, a platform for supporting an enlarged layout of a profile to be reproduced on the workpiece, a microscope having an eye piece and an objective lens, for viewing the workpiece and grinding wheel and further optical elements whereby an image of the layout on the platform can be reduced and superimposed upon the image of the workpiece and grinding wheel visible through the microscope.

2. An optical profile grinding machine as claimed in claim 1 in which the further optical elements include a reducing lens through which an image of the layout is transmitted, a prism on which the reduced image of the layout is reflected and through which the image of the workpiece is visible through the microscope at the same scale as the layout image.

3. An optical profile grinding machine as claimed in claim 2 in which the prism comprises two elements arranged in face to face contact, the interface of such elements forming the reflecting surface.

4. An optical profile grinding machine as claimed in claim 2 in which the image of the layout is reflected in a mirror before passing through the reducing lens.

5. An optical profile grinding machine as claimed in claim 1 in which the microscope has means for adjusting its position to allow viewing of different portions of the workpiece and layout images.

6. An optical profile grinding machine as claimed in claim 1 in which optical elements of the microscope include a pair of eyepiece lenses, a prism and the objective lens.

7. An optical profile grinding machine as claimed in claim 1 in which the optical elements of the microscope includes a single eyepiece lens, a prism and the objective lens.

8. An optical profile grinding machine as claimed in claim 1 in which a light source is disposed at the opposite side of the workpiece and grinding wheel, from said further optical elements, to illuminate the workpiece profile.

9. An optical profile grinding machine as claimed in claim 2 in which the prism is provided with a surface through which light transmitted from a light source can be transmitted, said prism having a further internally reflecting surface arranged to reflect light from said source onto the surface at which the layout is reflected, and said light being reflected in a direction to illuminate the workpiece, said direction of reflection being coincident the direction from which the workpiece is viewed by an operator.

10. An optical profile grinding machine as claimed in claim 1 in which the grinding wheel support apparatus is adjustable in a plurality of directions.

11. An optical profile grinding machine as claimed in claim 1 in which the workpiece support is adjustable in a plurality of directions.

12. An optical profile grinding machine as claimed in claim 1 in which the image of the layout passes through a reducing lens which is replaceable to permit changes in the reduction of the image created thereby.

* * * * *